United States Patent
Cho et al.

(10) Patent No.: US 10,180,992 B2
(45) Date of Patent: Jan. 15, 2019

(54) ATOMIC UPDATING OF GRAPH DATABASE INDEX STRUCTURES

(71) Applicant: LinkedIn Corporation, Mountain View, CA (US)

(72) Inventors: SungJu Cho, Cupertino, CA (US); Jiahong Zhu, San Jose, CA (US); Yinyi Wang, Saratoga, CA (US); Roman A. Averbukh, Sunnyvale, CA (US); Scott M. Meyer, Berkeley, CA (US); Shyam Shankar, Sunnyvale, CA (US); Qingpeng Niu, San Jose, CA (US); Karan R. Parikh, San Francisco, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 194 days.

(21) Appl. No.: 15/058,032

(22) Filed: Mar. 1, 2016

(65) Prior Publication Data

US 2017/0255709 A1 Sep. 7, 2017

(51) Int. Cl.
G06F 17/30 (2006.01)

(52) U.S. Cl.
CPC .... *G06F 17/30949* (2013.01); *G06F 17/3033* (2013.01); *G06F 17/30336* (2013.01); *G06F 17/30587* (2013.01); *G06F 17/30958* (2013.01)

(58) Field of Classification Search
CPC ............ G06F 17/30442; G06F 3/0608; G06F 17/30153; G06F 17/30929; G06F 17/30097

(Continued)

(56) References Cited

U.S. PATENT DOCUMENTS 7,376,639 B2 5/2008 Kutsch
7,974,978 B2* 7/2011 Yan .................... G06Q 30/0201
705/7.29

(Continued)

FOREIGN PATENT DOCUMENTS

EP 2937797 A1 10/2015
WO 2012091844 A1 7/2012

OTHER PUBLICATIONS

Lei Zou et al., "Summarization Graph Indexing: Beyond Frequent Structure-Based Approach", DASFAA 2008, LNCS 4947, pp. 141-155, XP-019087336, Mar. 2008.

(Continued)

*Primary Examiner* — Michelle N Owyang
(74) *Attorney, Agent, or Firm* — Park, Vaughan, Fleming & Dowler LLP; Chia-Hsin Suen

(57) ABSTRACT

The disclosed embodiments provide a system for updating an index structure of a graph database storing a graph. During operation, the system includes, in the index structure, a first compressed edge store containing a first compact representation of edges in the graph at a first virtual time and a first series of updates to the edges after the first virtual time. At a second virtual time, the system creates a second compact representation of the edges from the first compact representation and the first series of updates. The system then appends, to the second compact representation, a second series of updates to the edges after the second virtual time to produce a second compressed edge store. Finally, the system updates the index structure by atomically replacing, in the index structure, a reference to the first compressed edge store with a reference to the second compressed edge store.

20 Claims, 10 Drawing Sheets

(58) Field of Classification Search
USPC .................................. 707/741–747, 790–812
See application file for complete search history.

(56) References Cited

U.S. PATENT DOCUMENTS

| | | | |
|---|---|---|---|
| 8,185,558 | B1 | 5/2012 | Narayanan |
| 8,527,497 | B2* | 9/2013 | Singh ................ G06F 17/30867 707/711 |
| 8,533,182 | B1 | 9/2013 | Charboneau |
| 8,736,612 | B1 | 5/2014 | Goldman |
| 9,189,520 | B2 | 11/2015 | May |
| 9,292,570 | B2 | 3/2016 | Sargeant |
| 9,372,891 | B2 | 6/2016 | Elias |
| 9,378,303 | B1 | 6/2016 | Shankar |
| 9,495,427 | B2 | 11/2016 | Abadi |
| 2003/0084043 | A1 | 5/2003 | Acharya |
| 2005/0071335 | A1 | 3/2005 | Kadatch |
| 2006/0036564 | A1* | 2/2006 | Yan ................... G06F 17/30247 |
| 2007/0192306 | A1 | 8/2007 | Papakonstantinou |
| 2007/0239694 | A1 | 10/2007 | Singh |
| 2008/0116449 | A1 | 5/2008 | Macready |
| 2008/0306910 | A1 | 12/2008 | Singh |
| 2009/0132503 | A1 | 5/2009 | Sun |
| 2009/0240649 | A1 | 9/2009 | Sereni |
| 2009/0240682 | A1 | 9/2009 | Balmin |
| 2010/0174692 | A1* | 7/2010 | Meyer ............... G06F 17/30893 707/696 |
| 2011/0270861 | A1 | 11/2011 | Arshavsky |
| 2011/0276781 | A1* | 11/2011 | Sengupta ............ G06F 12/0862 711/216 |
| 2012/0005224 | A1 | 1/2012 | Ahrens |
| 2012/0047114 | A1 | 2/2012 | Duan |
| 2012/0096043 | A1 | 4/2012 | Stevens, Jr. |
| 2012/0136884 | A1 | 5/2012 | Kanawa |
| 2012/0179644 | A1 | 7/2012 | Miranker |
| 2012/0284255 | A1 | 11/2012 | Schechter |
| 2013/0091122 | A1 | 4/2013 | Salch |
| 2013/0097180 | A1 | 4/2013 | Tseng |
| 2013/0254212 | A1* | 9/2013 | Rao ................... G06F 17/30625 707/746 |
| 2013/0332484 | A1* | 12/2013 | Gajic ................ G06F 17/30286 707/770 |
| 2014/0156632 | A1 | 6/2014 | Yu |
| 2014/0172914 | A1* | 6/2014 | Elnikety ........... G06F 17/30958 707/774 |
| 2014/0201234 | A1 | 7/2014 | Lee et al. |
| 2014/0280044 | A1 | 9/2014 | Huynh et al. |
| 2014/0310302 | A1 | 10/2014 | Wu |
| 2014/0330867 | A1 | 11/2014 | Sarkar |
| 2014/0337373 | A1 | 11/2014 | Morsi |
| 2015/0012523 | A1 | 1/2015 | Dey |
| 2015/0026158 | A1 | 1/2015 | Jin |
| 2015/0052134 | A1 | 2/2015 | Bornea |
| 2015/0120717 | A1 | 4/2015 | Kim |
| 2015/0120775 | A1 | 4/2015 | Shao |
| 2015/0127677 | A1 | 5/2015 | Wang |
| 2015/0134637 | A1 | 5/2015 | Pall |
| 2015/0149435 | A1 | 5/2015 | McKenna |
| 2015/0169686 | A1 | 6/2015 | Elias |
| 2015/0234888 | A1 | 8/2015 | Ahmed |
| 2015/0302300 | A1 | 10/2015 | Fletcher |
| 2016/0071233 | A1 | 3/2016 | Macko |
| 2016/0171540 | A1 | 6/2016 | Mangipudi |
| 2016/0188594 | A1 | 6/2016 | Ranganathan |
| 2016/0246842 | A1 | 8/2016 | Li |
| 2016/0260011 | A1 | 9/2016 | Corvinelli |
| 2016/0275177 | A1* | 9/2016 | Yin ................... G06F 17/30613 |
| 2016/0314220 | A1 | 10/2016 | Sachdev et al. |
| 2017/0010968 | A1 | 1/2017 | Li |

OTHER PUBLICATIONS

David W. Williams, "Graph Database Indexing Using Structured Graph Decomposition", 2007 IEEE, pp. 976-985, XP031095841, Apr. 2007.

Vijayan Prabhakaran, "Managing Large Graphs on Multi-Cores With Graph Awareness", USENIX, pp. 1-12, XP061013942, Apr. 11, 2013.

"Final Office Action issued in U.S. Appl. No. 15/058,028", dated Jul. 27, 2018, 10 Pages.

"Non Final Office Action issued in U.S. Appl. No. 15/058,028", dated Jan. 26, 2018, 20 Pages.

"International Search Report and Written Opinion issued in PCT application No. PCT/US2016/062719", dated Jan. 31, 2017, 14 Pages.

* cited by examiner

ATOMIC UPDATING OF GRAPH DATABASE INDEX STRUCTURES

RELATED APPLICATIONS

The subject matter of this application is related to the subject matter in a co-pending non-provisional application by inventors Srinath Shankar, Robert W. Stephenson, Andrew J. Carter, Maverick Shu-Bun Lee and Scott M. Meyer, entitled "Graph-Based Queries," having Ser. No. 14/858,178, and filing date Sep. 18, 2015.

The subject matter of this application is also related to the subject matter in a co-pending non-provisional application by the same inventors as the instant application and filed on the same day as the instant application, entitled "Index Structures for Graph Databases," having Ser. No. 15/058,028, and filing date Mar. 1, 2016.

BACKGROUND

Field

The disclosed embodiments relate to indexing of graph databases. More specifically, the disclosed embodiments relate to techniques for atomically swapping graph database index structures.

Related Art

Data associated with applications is often organized and stored in databases. For example, in a relational database data is organized based on a relational model into one or more tables of rows and columns, in which the rows represent instances of types of data entities and the columns represent associated values. Information can be extracted from a relational database using queries expressed in a Structured Query Language (SQL).

In principle, by linking or associating the rows in different tables, complicated relationships can be represented in a relational database. In practice, extracting such complicated relationships usually entails performing a set of queries and then determining the intersection of or joining the results. In general, by leveraging knowledge of the underlying relational model, the set of queries can be identified and then performed in an optimal manner.

However, applications often do not know the relational model in a relational database. Instead, from an application perspective, data is usually viewed as a hierarchy of objects in memory with associated pointers. Consequently, many applications generate queries in a piecemeal manner, which can make it difficult to identify or perform a set of queries on a relational database in an optimal manner. This can degrade performance and the user experience when using applications.

A variety of approaches have been used in an attempt to address this problem, including using an object-relational mapper, so that an application effectively has an understanding or knowledge about the relational model in a relational database. However, it is often difficult to generate and to maintain the object-relational mapper, especially for large, real-time applications.

Alternatively, a key-value store (such as a NoSQL database) may be used instead of a relational database. A key-value store may include a collection of objects or records and associated fields with values of the records. Data in a key-value store may be stored or retrieved using a key that uniquely identifies a record. By avoiding the use of a predefined relational model, a key-value store may allow applications to access data as objects in memory with associated pointers, i.e., in a manner consistent with the application's perspective. However, the absence of a relational model means that it can be difficult to optimize a key-value store. Consequently, it can also be difficult to extract complicated relationships from a key-value store (e.g., it may require multiple queries), which can also degrade performance and the user experience when using applications.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

Figure 1:
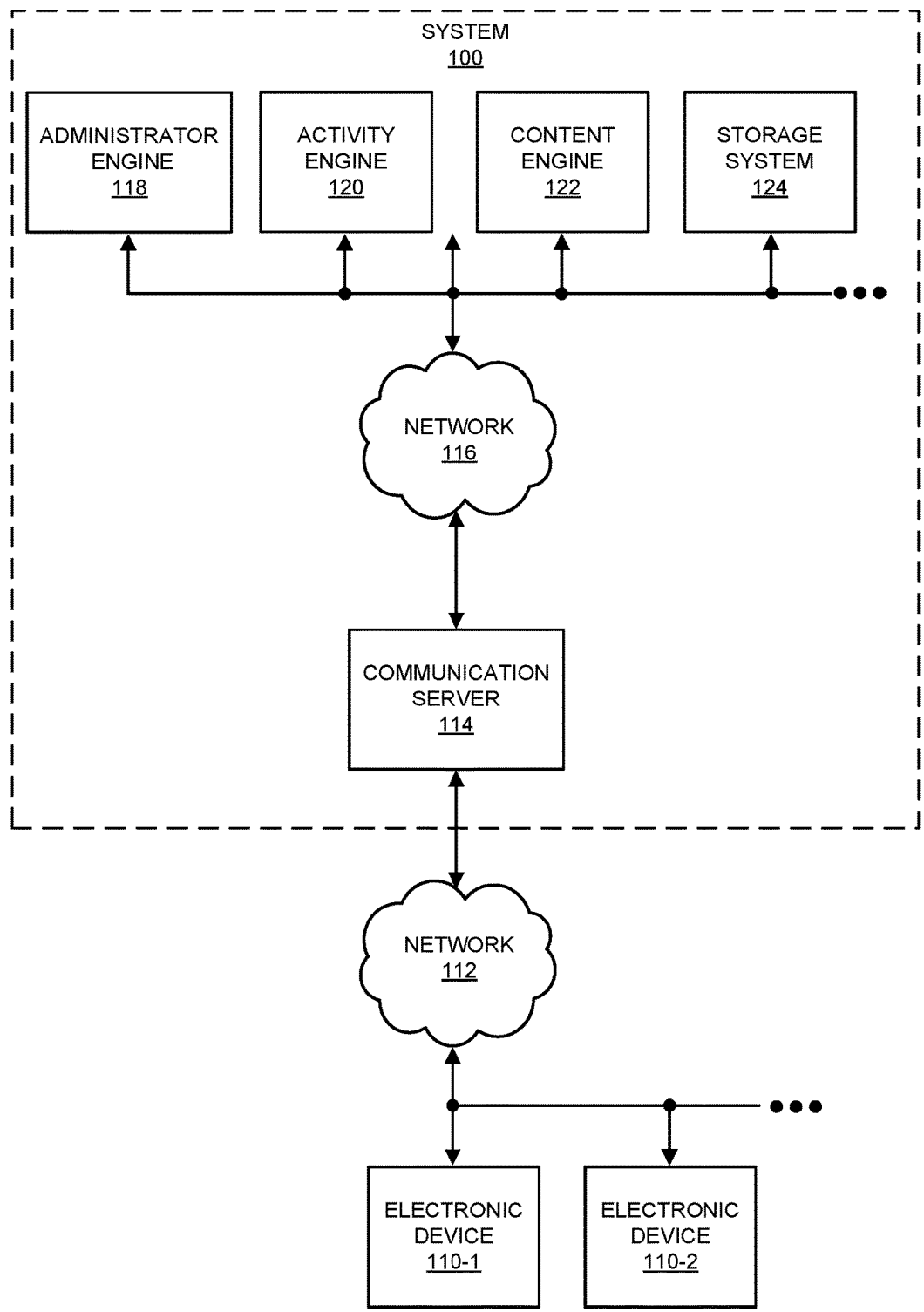
FIG. 1 shows a schematic of a system in accordance with the disclosed embodiments.

The disclosed embodiments provide a method, apparatus and system for processing queries of a graph database. A system 100 for performing a graph-storage technique is shown in FIG. 1. In this system, users of electronic devices 110 may use a service that is, at least in part, provided using one or more software products or applications executing in system 100. As described further below, the applications may be executed by engines in system 100.

Moreover, the service may, at least in part, be provided using instances of a software application that is resident on and that executes on electronic devices 110. In some implementations, the users may interact with a web page that is provided by communication server 114 via network 112, and which is rendered by web browsers on electronic devices 110. For example, at least a portion of the software application executing on electronic devices 110 may be an application tool that is embedded in the web page, and that executes in a virtual environment of the web browsers. Thus, the application tool may be provided to the users via a client-server architecture.

The software application operated by the users may be a standalone application or a portion of another application that is resident on and that executes on electronic devices 110 (such as a software application that is provided by communication server 114 or that is installed on and that executes on electronic devices 110).

A wide variety of services may be provided using system 100. In the discussion that follows, a social network (and, more generally, a network of users), such as an online professional network, which facilitates interactions among the users, is used as an illustrative example. Moreover, using one of electronic devices 110 (such as electronic device 110-1) as an illustrative example, a user of an electronic device may use the software application and one or more of the applications executed by engines in system 100 to interact with other users in the social network. For example, administrator engine 118 may handle user accounts and user profiles, activity engine 120 may track and aggregate user behaviors over time in the social network, content engine 122 may receive user-provided content (audio, video, text, graphics, multimedia content, verbal, written, and/or recorded information) and may provide documents (such as presentations, spreadsheets, word-processing documents, web pages, etc.) to users, and storage system 124 may maintain data structures in a computer-readable memory that may encompass multiple devices, i.e., a large-scale distributed storage system.

Note that each of the users of the social network may have an associated user profile that includes personal and professional characteristics and experiences, which are sometimes collectively referred to as 'attributes' or 'characteristics.' For example, a user profile may include: demographic information (such as age and gender), geographic location, work industry for a current employer, an employment start date, an optional employment end date, a functional area (e.g., engineering, sales, consulting), seniority in an organization, employer size, education (such as schools attended and degrees earned), employment history (such as previous employers and the current employer), professional development, interest segments, groups that the user is affiliated with or that the user tracks or follows, a job title, additional professional attributes (such as skills), and/or inferred attributes (which may include or be based on user behaviors). Moreover, user behaviors may include: log-in frequencies, search frequencies, search topics, browsing certain web pages, locations (such as IP addresses) associated with the users, advertising or recommendations presented to the users, user responses to the advertising or recommendations, likes or shares exchanged by the users, interest segments for the likes or shares, and/or a history of user activities when using the social network. Furthermore, the interactions among the users may help define a social graph in which nodes correspond to the users and edges between the nodes correspond to the users' interactions, interrelationships, and/or connections. However, as described further below, the nodes in the graph stored in the graph database may correspond to additional or different information than the members of the social network (such as users, companies, etc.). For example, the nodes may correspond to attributes, properties or characteristics of the users.

As noted previously, it may be difficult for the applications to store and retrieve data in existing databases in storage system 124 because the applications may not have access to the relational model associated with a particular relational database (which is sometimes referred to as an 'object-relational impedance mismatch'). Moreover, if the applications treat a relational database or key-value store as a hierarchy of objects in memory with associated pointers, queries executed against the existing databases may not be performed in an optimal manner. For example, when an application requests data associated with a complicated relationship (which may involve two or more edges, and which is sometimes referred to as a 'compound relationship'), a set of queries may be performed and then the results may be linked or joined. To illustrate this problem, rendering a web page for a blog may involve a first query for the three-most-recent blog posts, a second query for any associated comments, and a third query for information regarding the authors of the comments. Because the set of queries may be suboptimal, obtaining the results may be time-consuming. This degraded performance may, in turn, degrade the user experience when using the applications and/or the social network.

In order to address these problems, storage system 124 may include a graph database that stores a graph (e.g., as part of an information-storage-and-retrieval system or engine). Note that the graph may allow an arbitrarily accurate data model to be obtained for data that involves fast joining (such as for a complicated relationship with skew or large 'fan-out' in storage system 124), which approximates the speed of a pointer to a memory location (and thus may be well suited to the approach used by applications).

Figure 2:
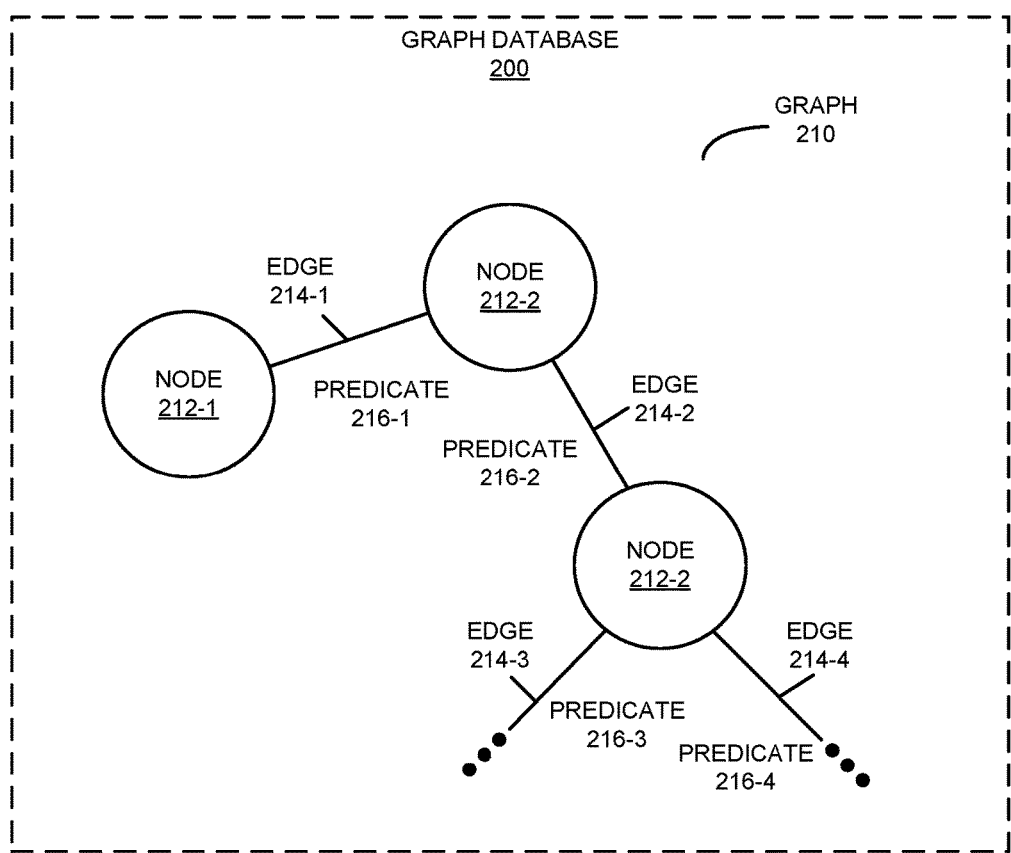
FIG. 2 shows a graph in a graph database in accordance with the disclosed embodiments.

FIG. 2 presents a block diagram illustrating a graph 210 stored in a graph database 200 in system 100 (FIG. 1). Graph 210 may include nodes 212, edges 214 between nodes 212, and predicates 216 (which are primary keys that specify or label edges 214) to represent and store the data with index-free adjacency, i.e., so that each node 212 in graph 210 includes a direct edge to its adjacent nodes without using an index lookup.

Note that graph database 200 may be an implementation of a relational model with constant-time navigation, i.e., independent of the size N, as opposed to varying as log(N). Moreover, all the relationships in graph database 200 may be first class (i.e., equal). In contrast, in a relational database, rows in a table may be first class, but a relationship that involves joining tables may be second class. Furthermore, a schema change in graph database 200 (such as the equivalent to adding or deleting a column in a relational database) may be performed with constant time (in a relational database, changing the schema can be problematic because it is often embedded in associated applications). Additionally, for graph database 200, the result of a query may be a subset of graph 210 that preserves intact the structure (i.e., nodes, edges) of the subset of graph 210.

The graph-storage technique may include embodiments of methods that allow the data associated with the applications and/or the social network to be efficiently stored and retrieved from graph database 200. Such methods are described in a co-pending non-provisional application by inventors Srinath Shankar, Rob Stephenson, Andrew Carter, Maverick Lee and Scott Meyer, entitled "Graph-Based Queries," having Ser. No. 14/858,178, and filing date Sep. 18, 2015, which is incorporated herein by reference.

Referring back to FIG. 1, the graph-storage techniques described herein may allow system 100 to efficiently and quickly (e.g., optimally) store and retrieve data associated with the applications and the social network without requiring the applications to have knowledge of a relational model implemented in graph database 200. Consequently, the graph-storage techniques may improve the availability and the performance or functioning of the applications, the social network and system 100, which may reduce user frustration and which may improve the user experience. Therefore, the graph-storage techniques may increase engagement with or use of the social network, and thus may increase the revenue of a provider of the social network.

Note that information in system 100 may be stored at one or more locations (i.e., locally and/or remotely). Moreover, because this data may be sensitive in nature, it may be encrypted. For example, stored data and/or data communicated via networks 112 and/or 116 may be encrypted.

Figure 3:
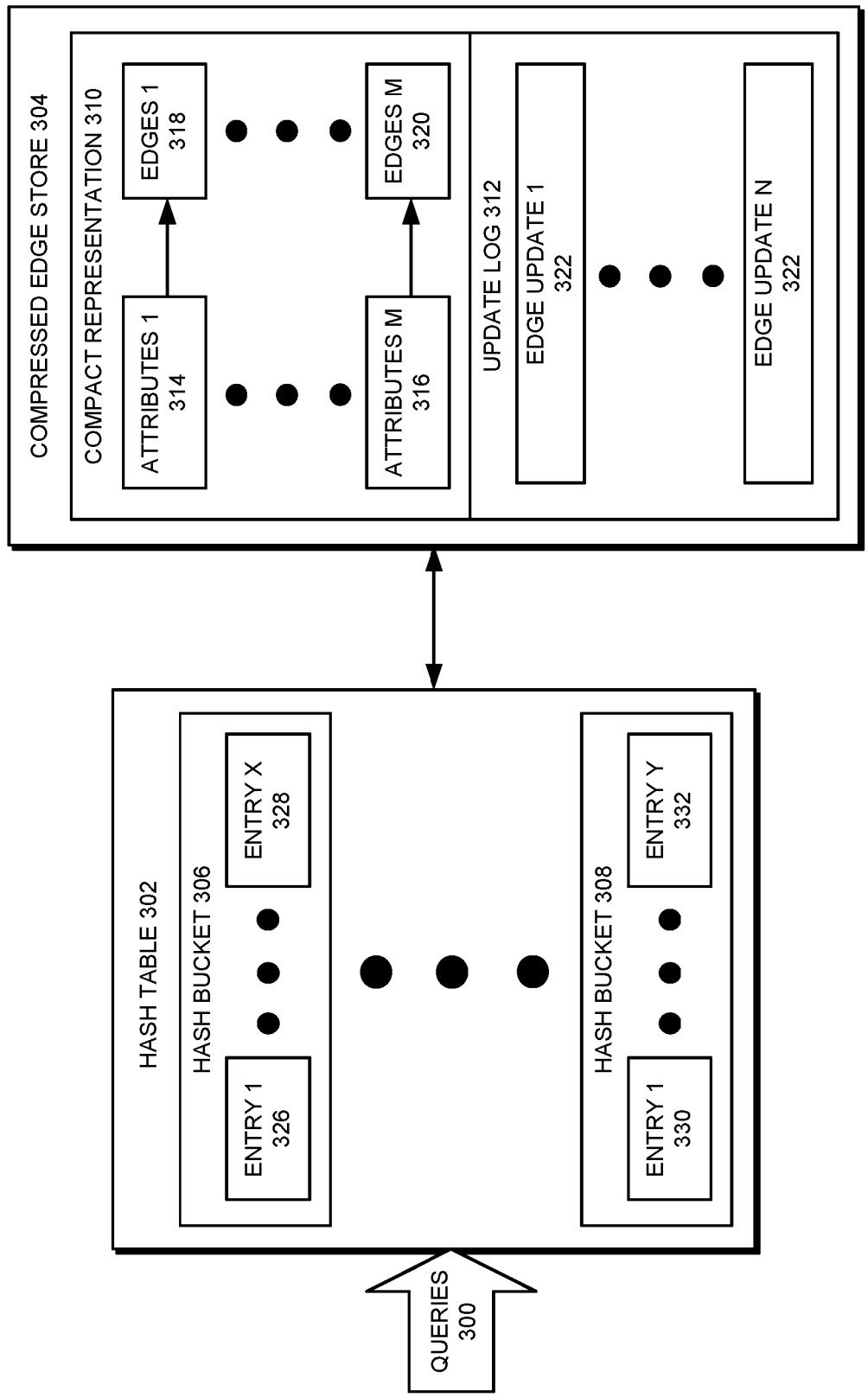
FIG. 3 shows an index structure for a graph database in accordance with the disclosed embodiments.

In one or more embodiments, efficient querying of graph database 200 of FIG. 2 is enabled using an index structure. As shown in FIG. 3, the index structure may include a hash table 302 and a compressed edge store 304. Hash table 302 and compressed edge store 304 may be accessed by a number of processes, including a single write process and multiple read processes. In turn, the processes may read from the index structure, write to the index structure, and/or perform atomic updates of the index structure, as described in further detail below.

Hash table 302 may include a set of hash buckets 306-308, each of which contains a set of entries (e.g., entry 1 326, entry x 328, entry 1 330, entry y 332). Each entry in the hash table may include one or more keys and one or more values associated with the key(s). The keys may include attributes by which the graph database is indexed, and the values may represent fields, records, edges, and/or other attributes in the graph database that are associated with the keys. For example, the keys may be subjects, predicates, and/or objects that partially define edges in the graph, and the values may include other attributes or fields that are used to resolve the edges. Hash tables for indexing graph databases are described in further detail below with respect to FIG. 4A.

In addition, some or all values stored in entries of hash table 302 may include references to records in compressed edge store 304 instead of attribute values that define edges in the graph. For example, an entry in hash table 302 may store one or more edge attributes as a key, along with a small number of other attributes as a value that represents the edges associated with the key. On the other hand, larger numbers of edges for a given key may occupy significantly more space in hash table 302. To keep hash table 302 at a manageable size, storage of some or all edges may be offloaded to compressed edge store 304, and references to the edges may be stored as the values with the matching keys in entries of hash table 302. A query containing a given key may then be resolved by matching the key to a hash table entry and using the value in the entry to retrieve the corresponding edges from compressed edge store 304.

More specifically, compressed edge store 304 may include an immutable compact representation 310 of edges (e.g., edges 1 318, edges m 320) in the graph at a given virtual time in the graph. As shown in FIG. 3, compact representation 310 includes a mapping of one or more attributes of the edges (e.g., attributes 1 314, attributes m 316) to each set of edges. For example, each set of edges in the compact representation may share the same value for two or more out of three attributes in a (subject, predicate, object) triple that defines an edge in the graph. As a result, the compact representation may include a first index that uses one or two attributes as a key to edges in the graph database and/or a second index that uses two or three attributes as a key to edges in the graph database. Compaction of the edges in compact representation 310 may be achieved by sorting the edges by a first attribute, further sorting the edges by a second attribute within each grouping of the edges by the first attribute, and specifying a set of values for one or more additional attributes of the edges for each grouping of the edges by the first, second, and/or third attributes. In other words, compact representation 310 may include a delta encoding of attributes of edges at a given virtual time in the graph, which improves storage of the edges in the index structure and lookup of the edges by the attributes.

Compressed edge store 304 also includes an update log 312 that stores a series of edge updates (e.g., edge update 1 322, edge update n 322) to the graph, since the virtual time at which compact representation 310 was created. For example, compact representation 310 may include all edges in the graph, up to an offset in a log-based representation of the graph database. To provide an up-to-date representation of the graph in compressed edge store 304, updates to the edges after the offset may be added to update log 312 as the updates are written to the log-based representation. To fully resolve a query using compressed edge store 304, a set of edges matching one or more attributes in the query may be obtained from compact representation 310, and additional updates to the edges since the creation of compact representation 310 may be obtained by linearly scanning through the edge updates in update log 312. The additional updates may then be merged with the edge set from compact representation 310, and the merged data may be returned in response to the query. Compressed edge stores in index structures for graph databases are described in further detail below with respect to FIG. 4B.

Figure 4A:
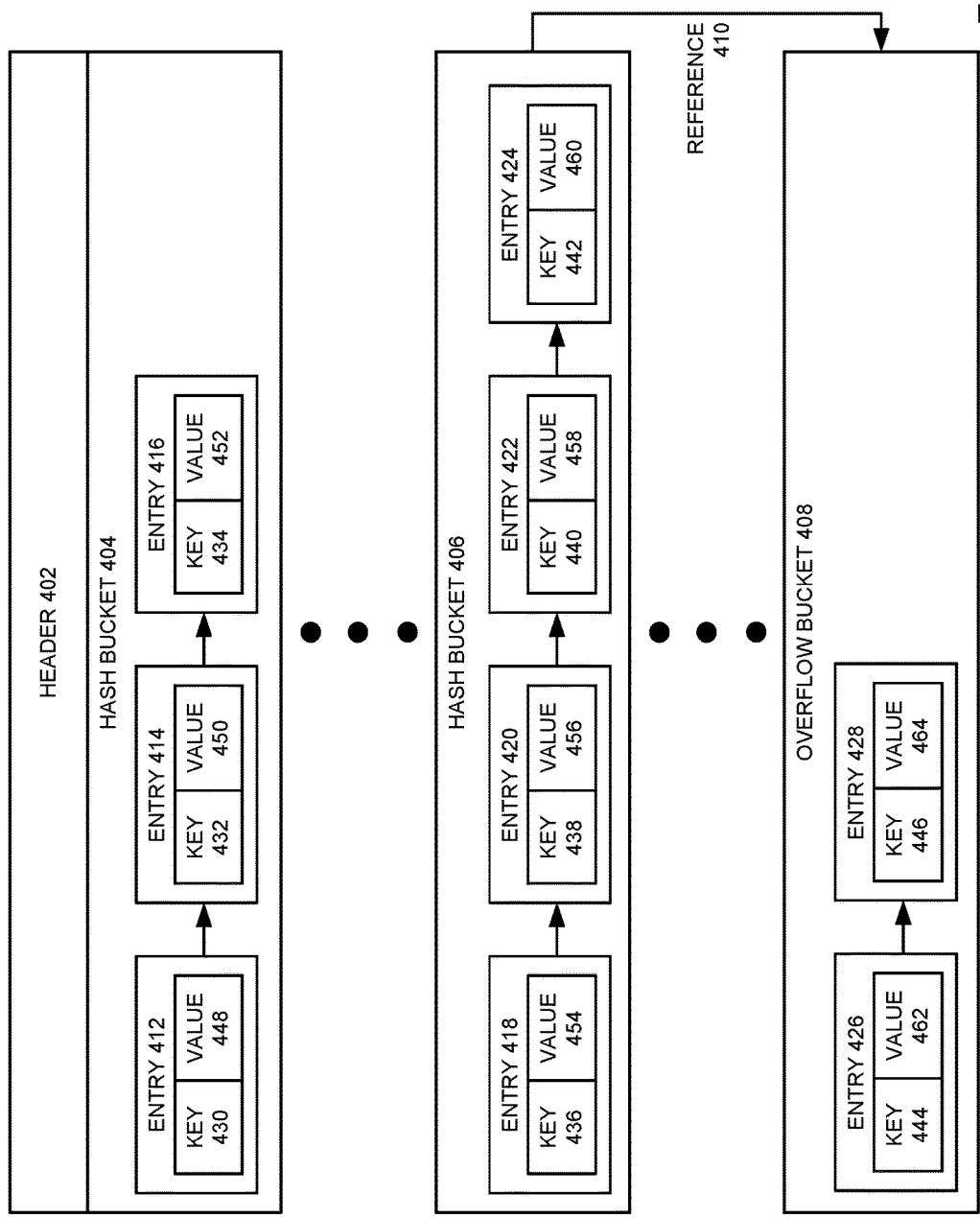
FIG. 4A shows an exemplary hash table in an index structure for a graph database in accordance with the disclosed embodiments.

FIG. 4A shows an exemplary hash table (e.g., hash table 302 of FIG. 3) in an index structure for a graph database in accordance with the disclosed embodiments. The hash table of FIG. 4A includes a header 402, a number of hash buckets 404-406, and an overflow bucket 408.

Header 402 may contain metadata related to the hash table or index structure. For example, header 402 may specify a numeric version of the index structure, a total size of the hash table, a number of hash buckets (e.g., hash buckets 404-406) in the hash table, and/or a fixed size of the hash buckets. Alternatively, the hash bucket size may be calculated by subtracting the size of header 402 from the total size of the hash table and dividing the remainder by the number of hash buckets. Information in header 402 may thus be used to generate a layout of the hash table in memory on a computer system.

Each of hash buckets 404-406 may store a series of entries (e.g., entries 412-416, entries 418-424) in a linked list, with each entry containing a key (e.g., keys 430-434, keys 436-442), a value (e.g., values 448-452, values 454-460), and a pointer or reference to the next entry in the linked list. As mentioned above, the keys may include attributes that partially or fully define edges in a graph stored in the graph database, and the corresponding values may be used to resolve the edges that match the keys. For example, the keys may include one or more attributes from a (subject, predicate, object) triple that defines an edge in the graph, and the values may include the remaining attributes in the triple for edges that match a given key and/or an offset to the remaining attributes in a compressed edge store, such as compressed edge store 304 of FIG. 3.

The hash table may further be organized so that a hash of a key is used to identify a hash bucket in the hash table, and a value of the key is used to identify the corresponding entry in the hash bucket. As a result, hash table entries with keys that produce the same hash value may be chained in a linked list within the same hash bucket, and lookup using the hash table may be performed in constant time.

Each hash bucket may also contain a header with metadata related to the contents of the hash bucket. For example, the metadata may include a first reference to the start of the linked list of entries in the hash bucket and a second reference (e.g., reference 410) to an overflow bucket (e.g., overflow bucket 408) containing additional hash table entries (e.g., entries 426-428) with the same hash as the hash bucket. While the hash bucket has remaining capacity, the second reference may be set to the end of the linked list or to a null or default value. When the remaining capacity of the hash bucket is consumed by entries in the linked list, an overflow bucket is instantiated in the hash table, additional entries are stored in the overflow bucket, and the second reference is set to a value that points to the overflow bucket.

To read an entry from the hash table, a hash of a key is used to locate a hash bucket in the hash table, and the linked list of entries in the hash bucket and/or one or more overflow buckets for the hash bucket is scanned until an entry matching the key is found. For example, a subject, object, subject-predicate pair, or object-predicate pair may be obtained from a query of the graph database as a key to the hash table, and the key may be hashed to identify the corresponding hash bucket in the hash table. The read operation may then iterate through entries in the hash bucket and possibly one or more overflow buckets linked to the hash bucket until an entry with the key is found, and the value in the entry may be returned in response to the query. If the value includes a reference to a record in a compressed edge store, the reference may be used to retrieve the corresponding edge values from the compressed edge store, and the edge values may be provided in a response to the query. If no entry with the key is found in the hash bucket and/or associated overflow buckets, the read operation may return a null value, a default value, and/or an insertion point containing an offset and remaining capacity for a new entry in the hash bucket or an overflow bucket linked to the hash bucket.

To write an entry to the hash table, a hash of a key is used to locate a hash bucket or an overflow bucket linked to the hash bucket, and the key and a value of the entry is appended to the end of the hash bucket or overflow bucket. The write operation may be preceded by a read operation that verifies the absence of an existing entry with the key in the hash table by returning an insertion point for the entry in the hash bucket or overflow bucket. If the remaining capacity of the bucket associated with the insertion point cannot accommodate the entry, a new overflow bucket is allocated in the hash table, metadata in the bucket is updated with a reference to the new overflow bucket, and the key and value are written to the first entry in the new overflow bucket. For example, a triple containing a subject, object, and predicate may be obtained from a write request to add an edge to the graph database. The subject, object, subject-predicate pair, or object-predicate pair may be used as a key to the write operation, a hash of the key may be used to identify a hash bucket, and entries in the hash bucket and/or associated overflow buckets may be scanned to determine if an entry containing the key exists in the hash or overflow buckets. If the entry is found, the value of the entry is used to identify a portion of a compressed edge store for storing the edge, and the subject, object, and/or predicate may be written to the portion. If the entry is not found, the entry is appended to the end of the hash bucket and/or an overflow bucket linked to the hash bucket, and remaining attributes in the triple not included in the key may be written to the value of the entry and/or a portion of the compressed edge store referenced by the value.

In one or more embodiments, the hash table of FIG. 4A is accessed in a lock-free manner by a set of processes. The processes may include a single write process and multiple read processes that map blocks in physical memory in which the hash table is stored into their respective virtual address spaces. As a result, the processes may access hash buckets, entries, and/or other portions of the hash table using offsets in the blocks instead of physical memory addresses.

To achieve lock-free access to the hash table, the write process may use word-aligned writes that are guaranteed to be atomic by the underlying hardware to commit modifications to the hash table. As described above, the write process may append an entry to a hash bucket or overflow bucket by writing the key and value for the entry to an offset representing an insertion point in the bucket. After the data is written to the offset, the write process may commit the write by atomically updating the last entry in the bucket with a word-aligned reference to the offset, thereby adding the newly written entry to the end of the linked list in the bucket. Because the entry is either fully visible or invisible to the read processes, reading of partial updates in the hash table may be averted.

Figure 4B:
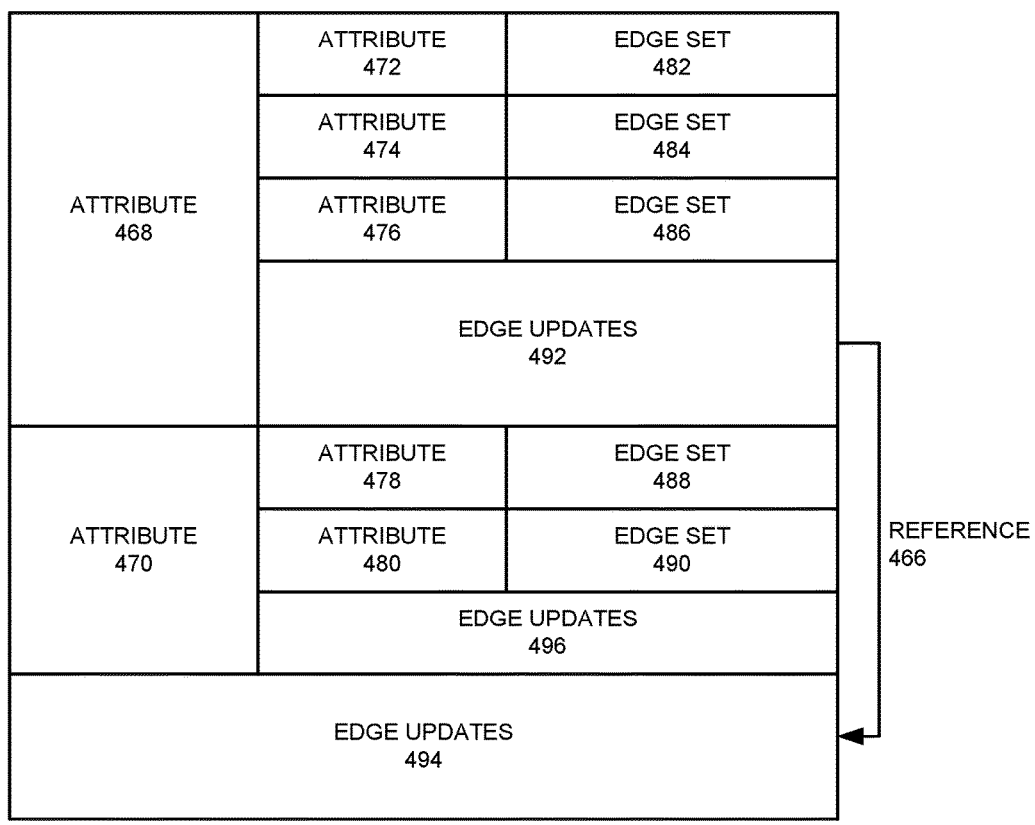
FIG. 4B shows an exemplary compressed edge store in an index structure for a graph database in accordance with the disclosed embodiments.

FIG. 4B shows an exemplary compressed edge store (e.g., compressed edge store 304 of FIG. 3) in an index structure for a graph database in accordance with the disclosed embodiments. The compressed edge store of FIG. 4B includes a number of edge sets 482-490 that are sorted and/or grouped by a number of attributes 468-480, as well as a number of edge updates 492-496 that are stored separately from edge sets 482-490.

Edge sets 482-490 may be stored in a compact representation (e.g., compact representation 310 of FIG. 3) of edges in a graph that is stored in the graph database. As described above, the compact representation may contain an immutable snapshot of the edges at a given virtual time in the graph. For example, the compact representation may include all edges in the graph, up to an offset in a log-based representation of the graph database.

To improve the storage and retrieval of edge sets 482-490, the compact representation may include a delta encoding of attributes 468-480 associated with the edge sets. As shown in FIG. 4B, attribute 468 may be shared by edge sets 482-486, and attribute 470 may be shared by edge sets 488-490. As a result, a single instance of each attribute 468-470 may be stored in the compact representation for all edges containing the attribute, and the edges may be sorted or grouped under the attribute. For example, attribute 468 may be a value of a subject that is shared by all edges in edge sets 482-486, and attribute 470 may be value of a subject that is shared by all edges in edge sets 488-490. Each region of the compressed edge store that is associated with attribute 468 or attribute 470 may be a "page" in memory, and a page header of the page may include a "page key" that is set to a value of the corresponding subject. The page header may also specify a size of the page and/or one or more offsets in the memory region.

In turn, edges that are grouped under a first attribute (e.g., attribute 468 or 470) may be further sorted or grouped under a second attribute (e.g., attributes 472-480). Within each secondary sorting, a single instance of the second attribute may be stored. Continuing with the previous example, attributes 472-476 may be predicates under which edges containing attribute 468 as the subject are further sorted, and attributes 478-480 may be predicates under which edges containing attribute 470 as the subject are further sorted. Each portion of the compressed edge store that is associated with a grouping of edges under a given subject and predicate may be a "record" in the corresponding page, and a record header of the record may include a "record key" that is set to a value of the predicate. The record header may also include a size of the record, a number of edges in an edge set (e.g., edge sets 482-490) stored in the record, and/or other attributes associated with the edge set or record.

Edge sets 482-490 may contain remaining attributes that are used to resolve edges associated with the corresponding groupings of attributes. Continuing with the previous example, each edge set for a given subject and predicate may be stored in a record with a record key that contains the predicate, and the record may be written to a page with a page key that contains the subject. The body of the record may contain a set of object values for all edges that match the subject and predicate, along with offsets of the edges in a log-based representation of the graph and/or timestamps representing the times at which the edges were created. The subject, predicate, and object values may define the edges in the edge set, while the offsets and/or timestamps may be used to filter the edges by the times at which the edges were added to the graph.

Sorting and/or organizing of edge sets 482-490 by attributes 468-480 may further facilitate lookup of edges in the graph by the attributes. For example, grouping of edge sets 482-486 under a single subject represented by attribute 468 may allow the edge sets to be returned in response to a query for edges containing the subject. Additional grouping of each edge set (e.g., edge sets 482-486) under a single predicate represented by a second attribute (e.g., attributes 472-476) may allow the edge set to be returned in response to a query for edges containing both the subject and predicate.

The offsets of pages and/or records in the compact representation may additionally be included in entries of the hash table of FIG. 4A to provide an index to the graph database. For example, a hash table entry containing attribute 468 as a key may store an offset of the page associated with attribute 468 as the corresponding value. In turn, attribute 468 may be used to locate the entry in the hash table, and the offset may be obtained from the entry and used to retrieve one or more edge sets 482-486 from the compact representation. In another example, a hash table entry containing attributes 468 and 476 as a key may store an offset of the record associated with attribute 476 as the corresponding value. Attributes 468 and 476 may be used to locate the entry in the hash table, and the offset stored in the entry may be used to retrieve edge set 486 from the compact representation.

The compressed edge store additionally includes a number of edge updates 492-496 that are written to mutable memory regions after the compact representation is created. For example, edge updates 492-496 may be copied to the compressed edge store from a log-based representation of the graph as the edge updates are written to the log-based representation. Edge updates 492 may share attribute 468, and edge updates 496 may share attribute 470. For example, edge updates 492 may have the same subject as edge sets 482-486 in the same page, and edge updates 496 may have the same subject as edge sets 488-490 in the same page. Offsets of the beginning and end of a series of edge updates may be stored in the page header of the corresponding page to facilitate reading of the edge updates and appending of new edge updates to the series without scanning through existing edge updates in the page. In addition, the size of the page may be selected to accommodate the corresponding edge sets in the compact representation, as well as a certain number of edge updates that are received after the compact representation is created.

If a series of edge updates (e.g., edge updates 492) reaches the end of the corresponding page, an additional page may be allocated in the compressed edge store to accommodate additional edge updates (e.g., edge updates 494) associated with the page, and a reference (e.g., reference 466) to the additional page may be stored in the original page. For example, the page header of the original page may be updated with an offset to the additional page.

If an edge update does not match an attribute (e.g., attributes 468-470) of an existing page in the compact representation, a new page may be created to accommodate the edge update. For example, an edge update with a new subject that does not match the subjects represented by attributes 468-470 may be stored in a new page with a page key that is set to the value of the new subject. Subsequent edge updates containing the new subject may then be appended to the new page as the edge updates are received. Alternatively, the edge update may be stored in a page of the compact edge store that contains only new edges and edge updates without storing any compact representations of edge sets.

To resolve a query using the compressed edge store, one or more edge attributes may be obtained from the query and matched to the corresponding page and/or a record in the page using a hash table entry that stores a key-value pair, with the key set to the edge attribute(s) the value set to an offset to the page and/or record. The offset may be used to retrieve one or more edge sets matching the edge attributes from the compact representation. Edge updates in the same page and/or an additional page referenced by the page may then be scanned for changes to the edge set(s) since the creation of the compact representation, and the changes may be merged with the edge set(s) to produce a result of the query. For example, a query for all edges that match attributes 470 and 478 may be used to retrieve edge set 488 from the compact edge store. Edge updates 496 that contain the same attributes may then be merged with edge set 488, and the merged data may be provided in a response to the query.

Those skilled in the art will appreciate that the efficiency of indexing using the hash table and compressed edge store of FIGS. 4A-4B may decrease as entries are added to the hash table and edge updates are added to the compressed edge store. For example, lookup using the hash table may slow as entries are chained to hash buckets or overflow buckets in the hash table, and efficient resolution of edges in the compressed edge store may gradually be hindered by a growing list of edge updates to the edges.

To mitigate or avert such performance degradation, the hash table and/or compressed edge store may be rebuilt after one or more criteria are met. For example, rebuilding of the hash table and/or compressed edge store may be performed when the remaining capacity of the hash table drops below a threshold, the number or percentage of overflow buckets in the hash table exceeds a threshold, the longest chain of hash and overflow buckets in the hash table exceeds a certain length, a ratio of edge updates to edge sets in the compressed edge store exceeds a threshold, and/or a certain interval has passed since the previous rebuild.

Moreover, rebuilding of the hash table and/or compressed edge store may be performed in a lock-free manner using one or more atomic operations. In particular, a new compact representation may be created by merging edge updates received as of a given virtual time in the graph into the edge sets of the existing compact representation. For example, a timestamp and/or latest offset of a log-based representation of the graph may be marked at the beginning of a rebuild process, and the new compact representation may be built by merging edge updates that precede the timestamp and/or latest offset into the existing compact representation in the compressed edge store. During creation of the new compact representation, new edge updates may be received and appended to the original compressed edge store, and the original compressed edge store may continue to be used to process queries of the graph database.

While the new compact representation is created, offsets of edge sets in the new compact representation may be calculated and included in a new hash table that references the new compact representation. For example, the merging of edge updates 492-494 into edge sets 482-486 to produce a new set of edge sets in the new compact representation may be followed by the creation of entries in the new hash table that reference the offsets of the new edge sets. One or more parameters of the new hash table may additionally be selected based on one or more attributes associated with the existing hash table to improve the indexing performance of the graph database. For example, the size of the new hash table may be selected to be larger than that of the existing hash table if the existing hash table contains a large number of overflow buckets and/or has little to no remaining capacity.

After the new compact representation and hash table are created, edges updates received since the initiation of the rebuild process may be appended to the new compact representation to produce a new compressed edge store. New entries may also be added to the hash table to reflect the edge updates until the new compressed edge store and hash table are up to date with the graph database. The index structure may then be updated with the new compressed edge store and hash table by atomically replacing one or more references to the original compressed edge store and hash table with references to the new compressed edge store and hash table. For example, an atomic, word-aligned write may be performed to update a directory in the index structure with pointers to the new compressed edge store and hash table.

After the index structure is updated to reference the new compressed edge store and hash table, the original compressed edge store and hash table may be maintained until processing of queries using the original compressed edge store and hash table is complete. Continuing with the previous example, read processes with pointers into the original compressed edge store and hash table may continue processing queries using the pointers and original structures. After the directory is updated with pointers to the new compressed edge store and hash table, the read processes may use the directory to obtain the pointers and process subsequent queries using the new compressed edge store and hash table. After all read processes have switched to processing queries using the new compressed edge store and hash table, resources occupied by the original compressed edge store and hash table may be freed.

Those skilled in the art will appreciate that the hash table and compressed edge store may be rebuilt together or separately. For example, the hash table may be resized independently of rebuilding of the compressed edge store to improve lookup of edges using entries in the hash table. Conversely, rebuilding of the compressed edge store may require, at a minimum, updating of offsets in the hash table to reflect the positions of new edge sets in the rebuilt compressed edge store.

The rebuilding process described above may be applied to the following exemplary representation of the hash table and compressed edge store:

| | |
|---|---|
| hash bucket 1 | [S1, offset] [(S2, P1), offset][(S3, P4), offset] . . . |
| hash bucket 2 | |
| hash bucket 3 | [(S2, P2), offset] |
| hash bucket 4 | [S2, offset] [S3, offset][(S1, P1), offset] |
| page (pagekey = S1) | [P1, edgeset] [edge updates . . . ] |
| page (pagekey = S2) | [P1, edgeset] [P2, edgeset] [P3, edgeset] [P4, edgeset] [edge updates . . . ] |
| hash bucket 1 overflow | [(S2, P3), offset] . . . |
| page (pagekey = S3) | [P4, edgeset] [edge updates . . . ] |
| overflow page (pagekey = S2) | [edge updates . . . ] |
| hash bucket 1 overflow | [(S2, P4), offset] . . . |

In the representation, a contiguous series of fixed-size hash buckets (e.g., "hash bucket 1," "hash bucket 2," "hash bucket 3," "hash bucket 4") is followed by two pages in the compressed edge store with page keys of "S1" and "S2," an overflow bucket for "hash bucket 1," a page in the compressed edge store with a page key of "S3," an overflow page with a page key of "S2," and a second overflow bucket for "hash bucket 1." Each hash bucket and associated overflow buckets may have a series of key-value pairs, with the key containing one or more attributes (e.g., "S1," "(S2, P1)," "(S2, P2)," etc.) of edges in the graph and the value set to a corresponding "offset" in the compressed edge store. Each page may include a series of records containing compact representations of edge sets by the corresponding page key and an additional attribute (e.g., "[P1, edgeset]," "[P2, edgeset]," etc.), followed by a number of "edge updates" to edges that match the page key. An overflow page for a page in the compressed edge store may store only edge updates that match the corresponding page key.

The hash table and compressed edge store may be rebuilt into the following representation:

| | |
|---|---|
| hash bucket 1 | [(S2, P1), offset] [(S3, P4), offset] |
| hash bucket 2 | [S3, offset] |
| hash bucket 3 | [(S1, Pa), offset] [S2, offset] [(S2, P2), offset] [(S2, Pb), offset] |
| hash bucket 4 | [S1, offset] [(S2, P3), offset] |
| hash bucket 5 | [(S1, P1), offset] [(S2, P4), offset] [(S3, Pd), offset] |
| page (pagekey = S1) | [P1, edgeset] [Pa, edgeset] |
| page (pagekey = S2) | [P1, edgeset] [P2, edgeset] [P3, edgeset] [P4, edgeset] [Pb, edgeset] [Pc, edgeset] |
| hash bucket 3 overflow | [(S2, Pc), offset] |
| page (pagekey = S3) | [P4, edgeset] [Pd, edgeset] |

In particular, the original hash table may be rebuilt into a new hash table with five hash buckets instead of four hash buckets. Edge updates in the pages and overflow pages of the original compressed edge store may also be merged into three pages of a new compressed edge store, with each page containing additional records for edge sets (e.g., "[Pa, edgeset]," "[Pb, edgeset]," "[Pc, edgeset]," etc.) that were not in the compact representations of the original compressed edge store. After a given page is generated in the new compressed edge store, the new hash table is updated with entries (e.g., "[(S1, Pa), offset]," "[(S2, Pb), offset]," etc.) that reference the attributes and offsets associated with the page. If a given hash bucket in the new hash table is filled to capacity with entries, an overflow bucket is allocated to accommodate additional entries for the hash bucket. For example, "hash bucket 3 overflow" may be allocated below the page with the page key of "S2" to store additional hash table entries for "hash bucket 3" during the addition of entries containing offsets to records in the page to the new hash table. After rebuilding of the hash table and compressed edge store is complete, edge updates received during the rebuilding process may be added to the hash table and compressed edge store, and references to the original hash table and compressed edge store may be atomically replaced with references to the new hash table and compressed edge store.

Figure 5:
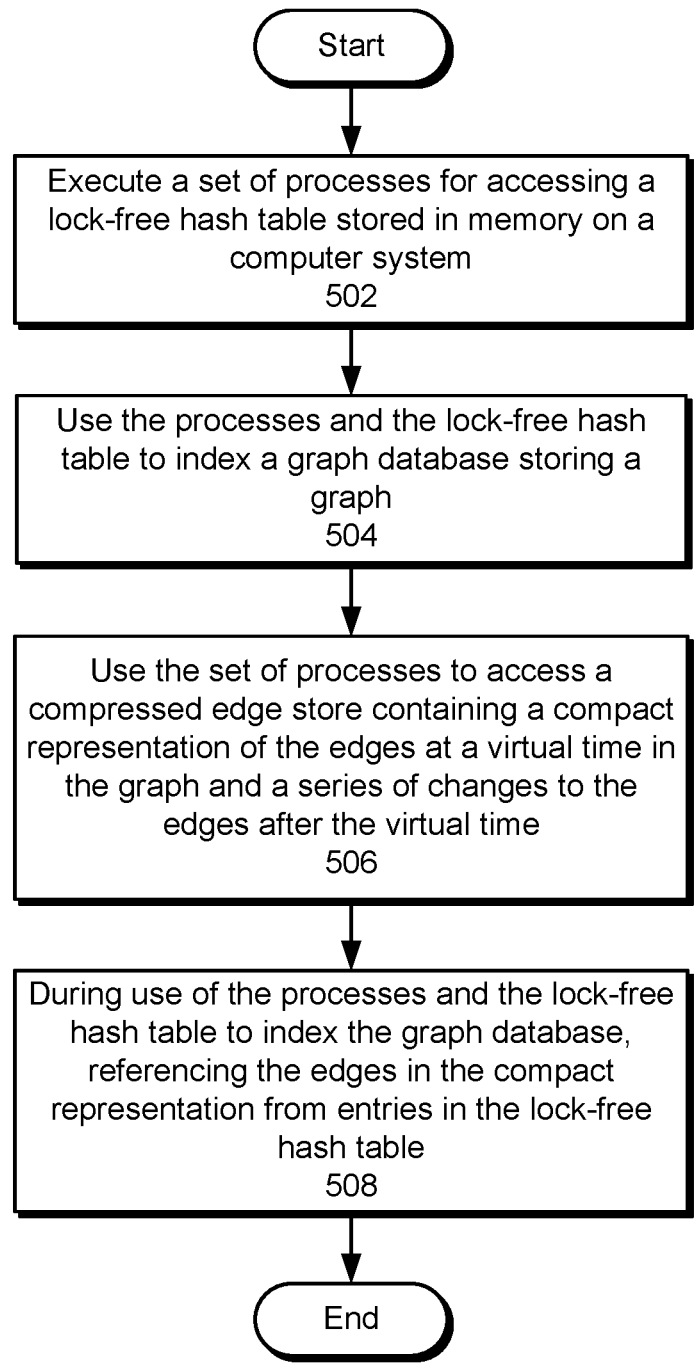
FIG. 5 shows a flowchart illustrating the process of providing an index to a graph database storing a graph in accordance with the disclosed embodiments.

FIG. 5 shows a flowchart illustrating the process of providing an index to a graph database storing a graph in accordance with the disclosed embodiments. In one or more embodiments, one or more of the steps may be omitted, repeated, and/or performed in a different order. Accordingly, the specific arrangement of steps shown in FIG. 5 should not be construed as limiting the scope of the technique.

Initially, a set of processes for accessing a lock-free hash table stored in memory on a computer system is executed (operation 502). The processes may include a single write process and multiple read processes. Next, the processes and the lock-free hash table are used to index a graph database storing a graph (operation 504). The graph may include a set of nodes, a set of edges between pairs of nodes, and a set of predicates. The index may allow querying of the graph database by attributes of the edges, such as subjects, predicates, and/or objects that partially or wholly define the edges.

The set of processes is also used to access a compressed edge store containing a compact representation of the edges at a virtual time in the graph and a series of updates to the edges after the virtual time (operation 506). For example, the compressed edge store may include a number of pages that are stored in the same memory block as the hash table. The edges in the compact representation are additionally referenced from entries in the lock-free hash table during use of the processes and the lock-free hash table to index the graph database (operation 508). For example, the processes may read and write key-value pairs from entries in the hash table, with the values containing offsets associated with edge sets in the compact representation and the keys containing attributes associated with the edge sets. The processes may use the attributes to locate the corresponding entries in the hash table, obtain offsets and/or other values from the entries, and use the values to obtain edge sets associated with the keys as results of queries of the graph database.

Figure 6:
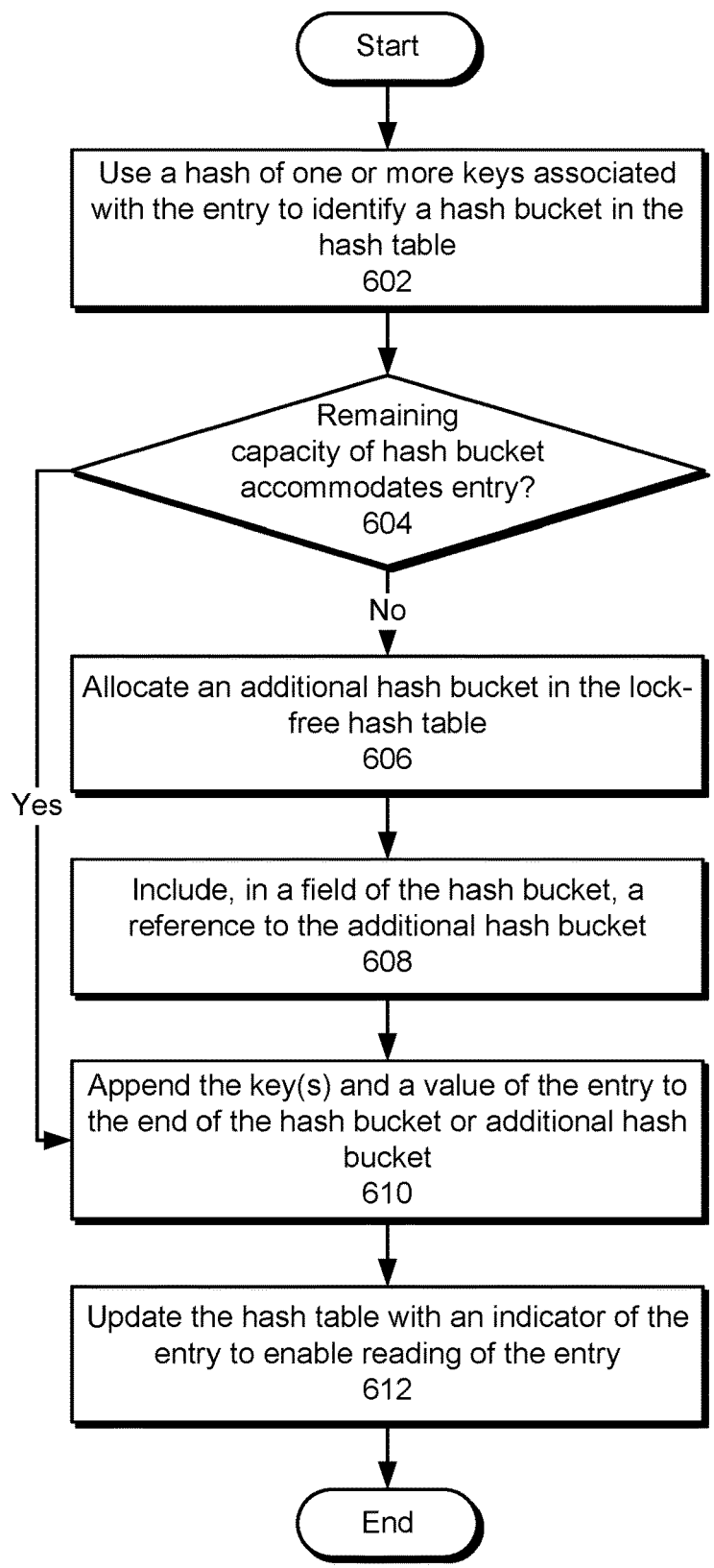
FIG. 6 shows a flowchart illustrating the process of writing an entry to a lock-free hash table in accordance with the disclosed embodiments.

FIG. 6 shows a flowchart illustrating the process of writing an entry to a lock-free hash table in accordance with the disclosed embodiments. In one or more embodiments, one or more of the steps may be omitted, repeated, and/or performed in a different order. Accordingly, the specific arrangement of steps shown in FIG. 6 should not be construed as limiting the scope of the technique.

First, a hash of one or more keys associated with the entry is used to identify a hash bucket in the hash table (operation 602). For example, a hash of a subject, predicate, and/or object associated with edges in a graph may be mapped to the hash bucket. Next, the entry may be written to the hash bucket and/or a different hash bucket based on the remaining capacity of the hash bucket (operation 604). For example, a read operation may be performed using the key(s) to verify the lack of an existing entry with the key(s) and return an insertion point that includes the remaining capacity of the hash bucket.

If the remaining capacity of the hash bucket cannot accommodate the entry, an additional hash bucket is allocated in the lock-free hash table (operation 606), and a reference to the additional hash bucket is included in a field of the hash bucket (operation 608). For example, the additional hash bucket may be allocated in memory, and a header of the hash bucket may be updated to point to the additional hash bucket. The additional hash bucket may then be selected for use in storing the entry in lieu of the hash bucket. If the remaining capacity of the hash bucket can accommodate the entry, no additional hash bucket is allocated.

The key(s) and a value of the entry are then appended to the end of the hash bucket or additional hash bucket (operation 610), and the hash table is updated with an indicator of the entry to enable reading of the entry (operation 612). For example, the key(s) and value may be written to an insertion point in the hash bucket or additional hash bucket. After writing of the entry is complete, the write may be made visible to read processes by atomically linking to the entry from a previous entry in the hash bucket.

Figure 7:
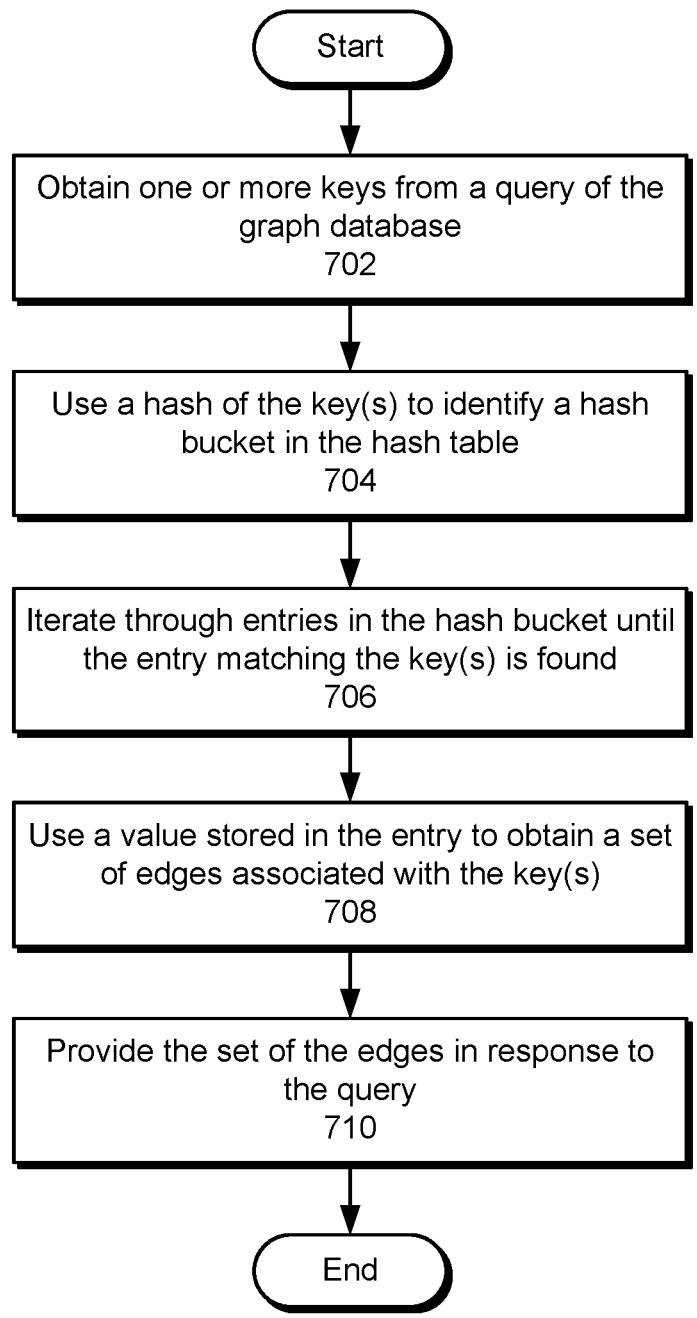
FIG. 7 shows a flowchart illustrating the process of reading an entry from a lock-free hash table in accordance with the disclosed embodiments.

FIG. 7 shows a flowchart illustrating the process of reading an entry from a lock-free hash table in accordance with the disclosed embodiments. In one or more embodiments, one or more of the steps may be omitted, repeated, and/or performed in a different order. Accordingly, the specific arrangement of steps shown in FIG. 7 should not be construed as limiting the scope of the technique.

Initially, one or more keys are obtained from a query of a graph database (operation 702). For example, the query may specify a subject, predicate, and/or object associated with edges in a graph stored in the graph database. Next, a hash of the key(s) is used to identify a hash bucket in the hash table (operation 704), and an iteration of entries in the hash bucket is performed until the entry matching the key(s) is found (operation 706). If the hash bucket contains a reference to an additional (e.g., overflow) hash bucket, entries in the additional hash bucket may also be iterated through to find an entry matching the key(s). If the hash table does not contain an entry that matches the key(s), an insertion point, null value, and/or default value may be returned in response to the query.

A value stored in the entry is then used to obtain a set of edges associated with the key(s) (operation 708). For example, the value may include one or more attributes that, with the key(s), define a set of edges matching the key(s). Alternatively, the value may include a reference to the set of edges, such as a reference to a page or record in a compressed edge store that contains the set of edges. Finally, the set of edges is provided in response to the query (operation 710). For example, the edges may be used to identify a set of users to which a user is connected within a social network and/or a subset of the users with a certain type of relationship with the user.

Figure 8:
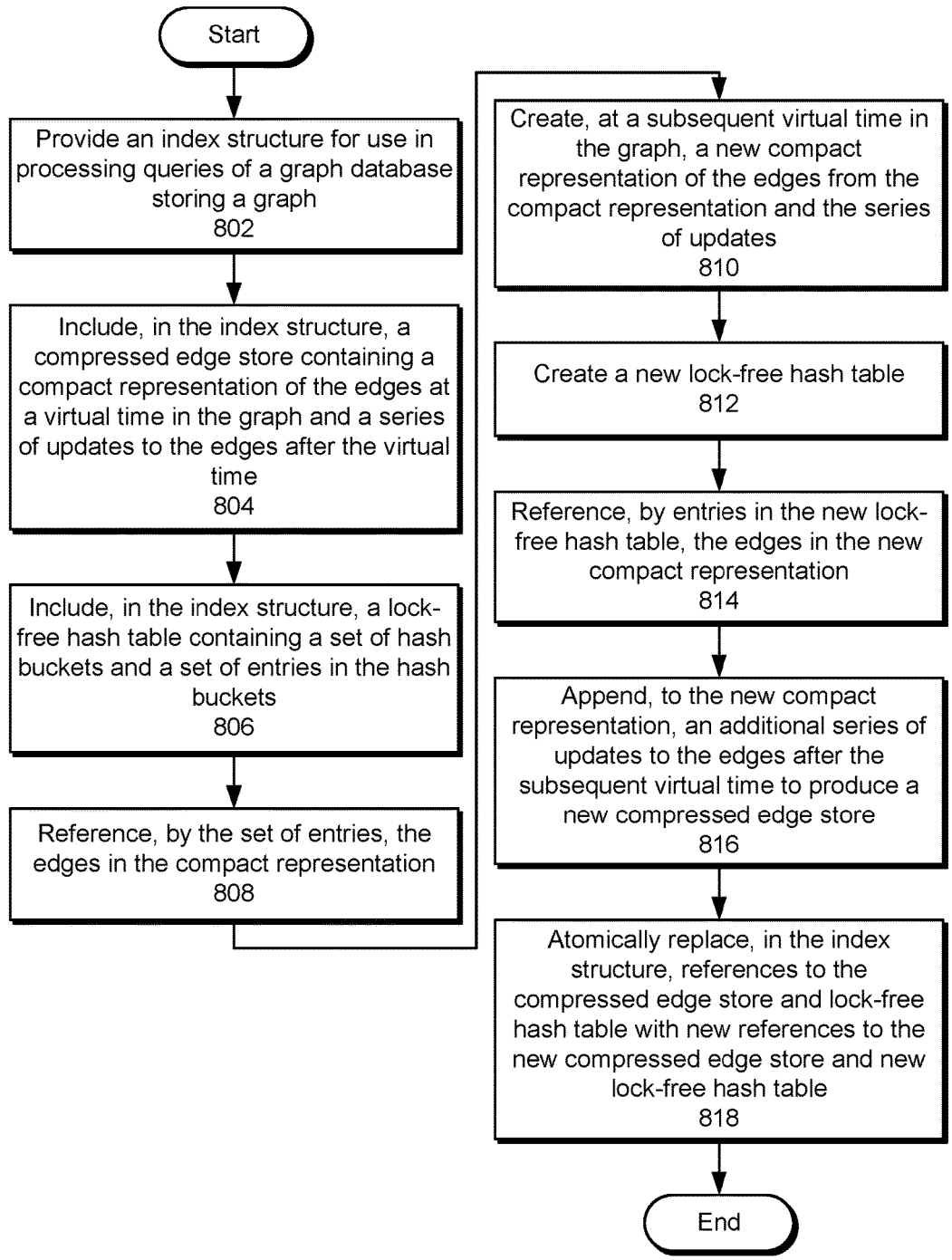
FIG. 8 shows a flowchart illustrating the process of updating an index structure for a graph database in accordance with the disclosed embodiments.

FIG. 8 shows a flowchart illustrating the process of updating an index structure for a graph database in accordance with the disclosed embodiments. In one or more embodiments, one or more of the steps may be omitted, repeated, and/or performed in a different order. Accordingly, the specific arrangement of steps shown in FIG. 8 should not be construed as limiting the scope of the technique.

First, an index structure is provided for use in processing queries of a graph database storing a graph (operation 802). For example, the index structure may be used to obtain edges in the graph that match one or more attributes of the edges. Next, a compressed edge store containing a compact representation of the edges at a virtual time in the graph and a series of updates to the edges after the virtual time is included in the index structure (operation 804), along with a lock-free hash table containing a set of hash buckets and a set of entries in the hash buckets (operation 806).

The compact representation may include a first sorting of the edges by a first attribute, a second sorting of the edges by a second attribute for each value of the first attribute in the first sorting, and a set of values for one or more additional attributes of the edges for each value of the second attribute in the second sorting. As a result, the number of instances of the first and second attributes may be reduced in the compact representation. For example, the compact representation may use a subject that defines edges in the graph as the first attribute and a predicate that defines the edges as the second attribute. As a result, a single instance of each subject value may be stored in the compact representation, and a single instance of each predicate value may be stored with each unique subject value. A series of object values, timestamps, and/or virtual times (e.g., log offsets) in the graphs may then be stored with each subject-predicate value pair to define the edges associated with the subject and predicate.

The set of entries in the hash table is also used to reference edges in the compact representation (operation 808). For example, attributes of edges in the graph may be used as keys to the lock-free hash table, and values stored with the keys in entries of the hash table may include offsets that are used to retrieve edge sets that match the attributes from the compact representation.

At a subsequent virtual time in the graph, a new compact representation of the edges is created from the compact representation and series of updates (operation 810) in the compressed edge store. For example, edge updates in the compressed edge store may be merged into existing edge sets and/or used to create new edge sets. The merged and/or new edge sets may then be written to one or more pages in the new compact representation.

A new lock-free hash table is also created (operation 812), and edges in the new compact representation are referenced by entries in the new lock-free hash table (operation 814).

For example, the size of the new lock-free hash table may be selected based on an attribute associated with the lock-free hash table, such as a remaining capacity of the lock-free hash table and/or a number of overflow buckets in the lock-free hash table. An entry may then be added to the new hash table for each edge set and/or sorting of attributes in the new compact representation.

An additional series of updates to the edges after the subsequent virtual time is then appended to the new compact representation to produce a new compressed edge store (operation 816). For example, the updates may be copied to the new compressed edge store from a log-based representation of the graph until the new compressed edge store contains an up-to-date representation of edges in the graph. Edge updates that are not associated with edge sets or existing pages in the new compact representation may be written to new pages in the new compressed edge store, and new entries that reference the new pages may be added to the hash table.

Finally, references to the compressed edge store and lock-free hash table in the index structure are atomically replaced with new references to the new compressed edge store and new lock-free hash table (operation 818). For example, word-aligned writes that are guaranteed to be atomic by the underlying hardware may be used to update a directory for the index structure with the new references. After the index structure is updated with the new references, the new compressed edge store and new lock-free hash table may be used to process queries of the graph database. At the same time, the original compressed edge store and original lock-free hash table may be maintained until processing of queries using the original compressed edge store and original lock-free hash table is complete.

Figure 9:
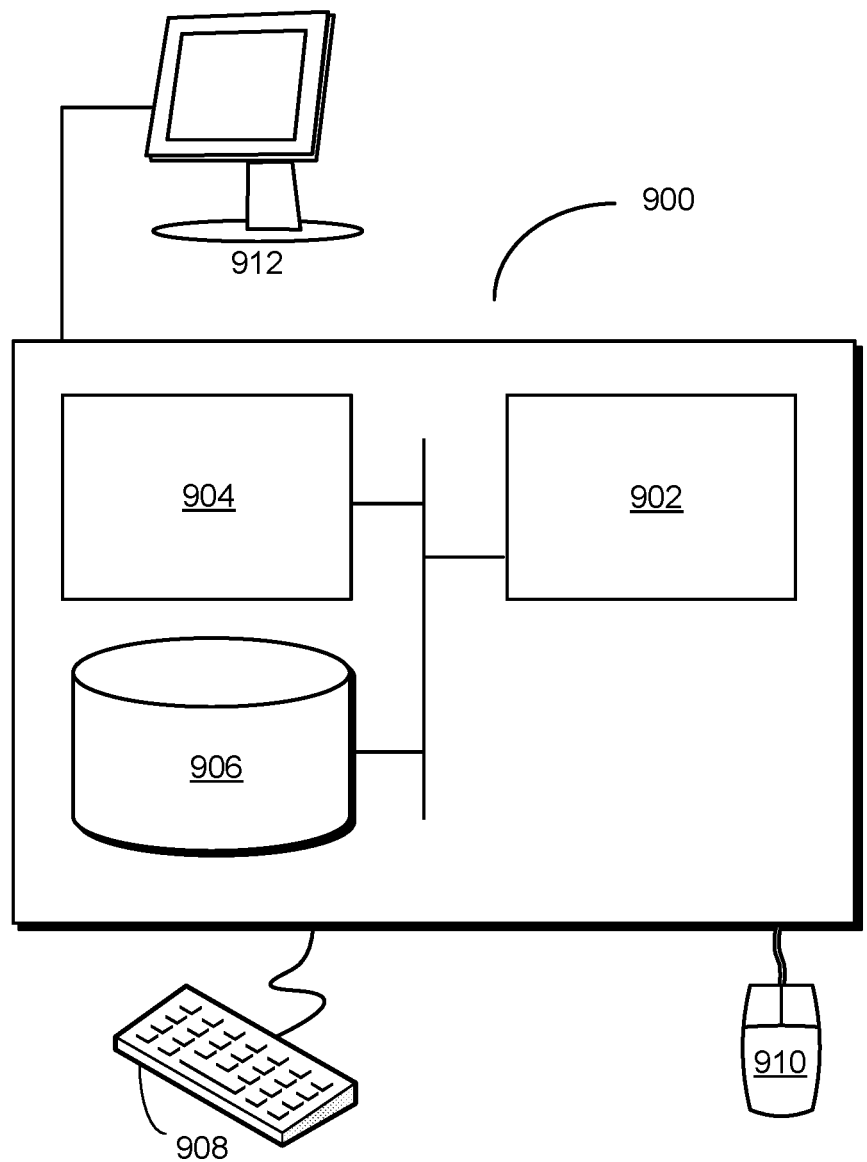
FIG. 9 shows a computer system in accordance with the disclosed embodiments.

FIG. 9 shows a computer system 900 in accordance with an embodiment. Computer system 900 may correspond to an apparatus that includes a processor 902, memory 904, storage 906, and/or other components found in electronic computing devices. Processor 902 may support parallel processing and/or multi-threaded operation with other processors in computer system 900. Computer system 900 may also include input/output (I/O) devices such as a keyboard 908, a mouse 910, and a display 912.

Computer system 900 may include functionality to execute various components of the present embodiments. In particular, computer system 900 may include an operating system (not shown) that coordinates the use of hardware and software resources on computer system 900, as well as one or more applications that perform specialized tasks for the user. To perform tasks for the user, applications may obtain the use of hardware resources on computer system 900 from the operating system, as well as interact with the user through a hardware and/or software framework provided by the operating system.

In one or more embodiments, computer system 900 provides a system for processing queries of a graph database storing a graph. The system includes a set of processes for accessing a lock-free hash table stored in memory on computer system 900. The processes may include a write process and multiple read processes that are spawned and/or managed by a management process or module in the system. The processes may use the lock-free hash table to provide an index to the graph database. The processes may also access a compressed edge store containing a compact representation of a set of edges in the graph at a virtual time in the graph and a series of updates to the edges after the virtual time. During use of the lock-free hash table to provide the index to the graph database, the processes may reference the edges in the compact representation from a set of entries in the lock-free hash table.

The processes may also perform atomic updating of index structures for the graph database. In particular, the processes may create, at a subsequent virtual time in the graph, a new compact representation of the edges from the compact representation and the series of edges. Next, the processes may append an additional series of updates to the edges after the subsequent virtual time to produce a new compressed edge store. The processes may also create a new lock-free hash table and reference the edges in the new compact representation from entries in the new lock-free hash table. Finally, the processes may update the index structure with the new compressed edge store and the new lock-free hash table by atomically replacing one or more references to the compressed edge store and lock-free hash table with references to the new compressed edge store and the new lock-free hash table.

In addition, one or more components of computer system 900 may be remotely located and connected to the other components over a network. Portions of the present embodiments (e.g., hash table, compressed edge store, etc.) may also be located on different nodes of a distributed system that implements the embodiments. For example, the present embodiments may be implemented using a cloud computing system that processes queries of a distributed graph database from a set of remote users.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A method, comprising:
providing, by a computer system, an index structure for use in processing queries of a graph database storing a graph, wherein the graph comprises a set of nodes, a set of edges between pairs of nodes in the set of nodes, and a set of predicates, and wherein the set of nodes and the set of predicates form a set of attributes;
creating, in the index structure, a first compressed edge store comprising a first compact representation of the set of edges at a first virtual time in the graph and a first series of updates to the set of edges after the first virtual time, wherein the first compact representation includes the set of edges, and wherein creating the first compact representation includes:
grouping the set of edges into a set of compact groupings based on the set of attributes, wherein the set of compact groupings includes a first grouping indexed by a first attribute in the set of attributes; and
forming the first grouping by storing a single instance of the first attribute and storing a first subset of edges in the set of edges which shares the first attribute together with the single instance of the first attribute;
creating, at a second virtual time in the graph, a second compact representation of the set of edges from the first compact representation and the first series of updates, wherein the second compact representation includes the set of edges, and wherein creating the second compact representation includes:

updating the first grouping by storing a first subset of updates in the first series of updates which shares the first attribute together with the single instance of the first attribute;
appending, to the second compact representation, a second series of updates to the set of edges after the second virtual time to produce a second compressed edge store; and
updating the index structure with the second compressed edge store by atomically replacing, in the index structure, a first reference to the first compressed edge store with a second reference to the second compressed edge store,
wherein storing the set of edges by grouping the set of edges under a set of shared attributes and storing a single instance of a given shared attribute instead of storing multiple instances of the given shared attribute facilitates reducing storage requirement and improving edge lookup speed.

2. The method of claim 1, further comprising:
including, in the index structure, a first lock-free hash table comprising a first set of hash buckets and a first set of entries in the first set of hash buckets; and
referencing, by the first set of entries, the set of edges in the first compact representation.

3. The method of claim 2, further comprising:
creating a second lock-free hash table comprising a second set of hash buckets and a second set of entries in the second set of hash buckets;
referencing, by the second set of entries, the set of edges in the second compact representation; and
updating the index structure with the second lock-free hash table by atomically replacing, in the index structure, a third reference to the first lock-free hash table with a fourth reference to the second lock-free hash table.

4. The method of claim 3, wherein creating the second lock-free hash table comprises:
selecting a size of the second lock-free hash table based on an attribute associated with the first lock-free hash table.

5. The method of claim 4, wherein the attribute is at least one of:
a remaining capacity of the first lock-free hash table; and
a number of overflow buckets in the first lock-free hash table.

6. The method of claim 1, further comprising:
after the first reference is replaced with the second reference in the index structure, maintaining the first compressed edge store until processing of the queries using the first compressed edge store is complete.

7. The method of claim 1, wherein the first compact representation comprises:
a first sorting of the edges by a first attribute; and
for each value of the first attribute in the first sorting, a second sorting of the edges by a second attribute.

8. The method of claim 7, wherein the first compact representation further comprises:
for each value of the second attribute in the second sorting, a set of values for one or more additional attributes of the edges.

9. The method of claim 8, wherein the one or more additional attributes comprise a virtual time in the graph.

10. The method of claim 7, wherein the first attribute and the second attribute comprise at least one of:
- a subject;
- a predicate; and
- an object.

11. The method of claim 1, wherein the second series of updates is appended to the second compact representation from a log-based representation of the graph database.

12. An apparatus, comprising:
one or more processors; and
memory storing instructions that, when executed by the one or more processors, cause the apparatus to:
provide an index structure for use in processing queries of a graph database storing a graph, wherein the graph comprises a set of nodes, a set of edges between pairs of nodes in the set of nodes, and a set of predicates, and wherein the set of nodes and the set of predicates form a set of attributes;
create, in the index structure, a first compressed edge store comprising a first compact representation of the set of edges at a first virtual time in the graph and a first series of updates to the set of edges after the first virtual time, wherein the first compact representation includes the set of edges, and wherein creating the first compact representation includes:
grouping the set of edges into a set of compact groupings based on the set of attributes, wherein the set of compact groupings includes a first grouping indexed by a first attribute in the set of attributes; and
forming the first grouping by storing a single instance of the first attribute and storing a first subset of edges in the set of edges which shares the first attribute together with the single instance of the first attribute;
create, at a second virtual time in the graph, a second compact representation of the set of edges from the first compact representation and the first series of updates, wherein the second compact representation includes the set of edges, and wherein creating the second compact representation includes:
updating the first grouping by storing a first subset of updates in the first series of updates which shares the first attribute together with the single instance of the first attribute;
append, to the second compact representation, a second series of updates to the set of edges after the second virtual time to produce a second compressed edge store; and
update the index structure with the second compressed edge store by atomically replacing, in the index structure, a first reference to the first compressed edge store with a second reference to the second compressed edge store,
wherein storing the set of edges by grouping the set of edges under a set of shared attributes and storing a single instance of a given shared attribute instead of storing multiple instances of the given shared attribute facilitates reducing storage requirement and improving edge lookup speed.

13. The apparatus of claim 12, wherein the memory further stores instructions that, when executed by the one or more processors, cause the apparatus to:
include, in the index structure, a first lock-free hash table comprising a first set of hash buckets and a first set of entries in the first set of hash buckets; and
reference, by the first set of entries, the set of edges in the first compact representation.

14. The apparatus of claim 13, wherein the memory further stores instructions that, when executed by the one or more processors, cause the apparatus to:
create a second lock-free hash table comprising a second set of hash buckets and a second set of entries in the second set of hash buckets;
reference, by the second set of entries, the set of edges in the second compact representation; and
update the index structure with the second lock-free hash table by atomically replacing, in the index structure, a third reference to the first lock-free hash table with a fourth reference to the second lock-free hash table.

15. The apparatus of claim 14, wherein creating the second lock-free hash table comprises:
selecting a size of the second lock-free hash table based on an attribute associated with the first lock-free hash table.

16. The apparatus of claim 12, wherein the first compact representation comprises:
a first sorting of the edges by a first attribute; and
for each value of the first attribute in the first sorting, a second sorting of the edges by a second attribute.

17. The apparatus of claim 16, wherein the first compact representation further comprises:
for each value of the second attribute in the second sorting, a set of values for one or more additional attributes of the edges.

18. A system, comprising:
a management module comprising a non-transitory computer-readable medium comprising instructions that, when executed by one or more processors, cause the system to:
provide an index structure for use in processing queries of a graph database storing a graph, wherein the graph comprises a set of nodes, a set of edges between pairs of nodes in the set of nodes, and a set of predicates, and wherein the set of nodes and the set of predicates form a set of attributes; and
create, in the index structure, a first compressed edge store comprising a first compact representation of the set of edges at a first virtual time in the graph and a first series of updates to the set of edges after the first virtual time, wherein the first compact representation includes the set of edges, and wherein creating the first compact representation includes:
grouping the set of edges into a set of compact groupings based on the set of attributes, wherein the set of compact groupings includes a first grouping indexed by a first attribute in the set of attributes; and
forming the first grouping by storing a single instance of the first attribute and storing a first subset of edges in the set of edges which shares the first attribute together with the single instance of the first attribute; and
an update module comprising a non-transitory computer-readable medium comprising instructions that, when executed by one or more processors, cause the system to:
create, at a second virtual time in the graph, a second compact representation of the set of edges from the first compact representation and the first series of updates, wherein the second compact representation includes the set of edges, and wherein creating the second compact representation includes:

updating the first grouping by storing a first subset of updates in the first series of updates which shares the first attribute together with the single instance of the first attribute;

append, to the second compact representation, a second series of updates to the set of edges after the second virtual time to produce a second compressed edge store; and update the index structure with the second compressed edge store by atomically replacing, in the index structure, a first reference to the first compressed edge store with a second reference to the second compressed edge store, wherein storing the set of edges by grouping the set of edges under a set of shared attributes and storing a single instance of a given shared attribute instead of storing multiple instances of the given shared attribute facilitates reducing storage requirement and improving edge lookup speed.

19. The system of claim 18, wherein the non-transitory computer-readable medium of the management module further comprises instructions that, when executed by the one or more processors, cause the system to:

include, in the index structure, a first lock-free hash table comprising a first set of hash buckets and a first set of entries in the first set of hash buckets; and reference, by the first set of entries, the set of edges in the first compact representation.

20. The system of claim 19, wherein the non-transitory computer-readable medium of the update module further comprises instructions that, when executed by the one or more processors, cause the system to:

create a second lock-free hash table comprising a second set of hash buckets and a second set of entries in the second set of hash buckets;

reference, by the second set of entries, the set of edges in the second compact representation; and update the index structure with the second lock-free hash table by atomically replacing, in the index structure, a third reference to the first lock-free hash table with a fourth reference to the second lock-free hash table.

* * * * *